United States Patent
Mok

(10) Patent No.: US 12,539,484 B2
(45) Date of Patent: Feb. 3, 2026

(54) COLLAPSIBLE AND FOLDABLE PLEATED DISPOSABLE AIR FILTER

(71) Applicant: Woosh Air Inc., San Francisco, CA (US)

(72) Inventor: Winston Mok, San Francisco, CA (US)

(73) Assignee: Woosh Air Inc., San Francisco, CA (US)

( * ) Notice: Subject to any disclaimer, the term of this patent is extended or adjusted under 35 U.S.C. 154(b) by 560 days.

(21) Appl. No.: 17/592,319

(22) Filed: Feb. 3, 2022

(65) Prior Publication Data

US 2023/0089672 A1    Mar. 23, 2023

Related U.S. Application Data

(60) Provisional application No. 63/244,052, filed on Sep. 14, 2021.

(51) Int. Cl.
    *B01D 46/52*    (2006.01)
    *B01D 46/00*    (2022.01)

(52) U.S. Cl.
    CPC ....... *B01D 46/522* (2013.01); *B01D 46/0001* (2013.01); *B01D 46/0005* (2013.01); *B01D 2265/04* (2013.01)

(58) Field of Classification Search
    CPC .............. B01D 46/522; B01D 46/0001; B01D 46/0005; B01D 2265/04; B01D 2275/203; B01D 46/0016; B01D 46/521; B01D 2201/12; B01D 46/62; B01D 2239/0681; B01D 2201/122

USPC ................................................. 55/497, 521
See application file for complete search history.

(56) References Cited

U.S. PATENT DOCUMENTS

| | | | |
|---|---|---|---|
| 4,312,645 A | 1/1982 | Mavros et al. |
| 4,610,703 A | 9/1986 | Kowalczyk |
| 5,009,225 A | 4/1991 | Vrabel |
| 5,217,513 A | 6/1993 | Armbruster |
| 5,240,478 A | 8/1993 | Messina |
| 5,464,461 A | 11/1995 | Whitson et al. |
| 5,766,285 A | 6/1998 | Killman |
| 5,795,361 A | 8/1998 | Lanier, Jr. et al. |
| 5,843,198 A | 12/1998 | Walker |
| 6,030,427 A | 2/2000 | Sorice et al. |
| 6,398,835 B1 | 6/2002 | Rehil |
| 8,021,618 B1 | 9/2011 | Cooper |
| 8,231,716 B2 | 7/2012 | Poon |
| 8,744,780 B2 | 6/2014 | Wilson, Jr. et al. |
| D725,254 S | 3/2015 | Roblin |
| 9,593,861 B1 | 3/2017 | Burnett |
| D950,698 S | 5/2022 | Ramphal et al. |

(Continued)

*Primary Examiner* — Jennifer Dieterle
*Assistant Examiner* — Qianping He
(74) *Attorney, Agent, or Firm* — NIXON PEABODY LLP

(57) ABSTRACT

A foldable and disposable air filter media for insertion into an air filter frame is disclosed. The air filter media includes two or more filter pleated strips that are joined together. The outer edges of the air filter media are fixed to the frame to form the air filter. Each of the filter pleated strips have a number of pleats that increase the area to reduce pressure drop across the filter media while allowing air flow through to remove unwanted particles from the filtered air. A folding crease is formed between the opposite border edges of the air filter media allowing the air filter media to be folded for shipping or disposal.

15 Claims, 5 Drawing Sheets

(56) References Cited

U.S. PATENT DOCUMENTS

| | | |
|---|---|---|
| 11,865,482 B2 | 1/2024 | Kluck et al. |
| 2005/0138906 A1 | 6/2005 | Kubokawa et al. |
| 2007/0140924 A1 | 6/2007 | Hill |
| 2008/0148698 A1 | 6/2008 | Nowak et al. |
| 2009/0199526 A1 | 8/2009 | Wallace |
| 2009/0249957 A1 | 10/2009 | Lackey, Sr. |
| 2011/0005177 A1 | 1/2011 | Pfannenberg |
| 2012/0125592 A1 | 5/2012 | Fadell et al. |
| 2014/0260984 A1 | 9/2014 | Morgan |
| 2015/0013287 A1* | 1/2015 | Yamaguchi ........ B01D 46/0002 55/497 |
| 2015/0277373 A1 | 10/2015 | Yamaguchi et al. |
| 2016/0263514 A1* | 9/2016 | Epli .................. B01D 46/2414 |
| 2016/0378057 A1 | 12/2016 | Yamaguchi et al. |
| 2017/0128875 A1 | 5/2017 | Prather et al. |
| 2018/0304184 A1 | 10/2018 | Gunnefur |
| 2019/0262754 A1* | 8/2019 | Barry ................... B01D 46/521 |
| 2020/0139289 A1* | 5/2020 | Tapper ................... B01D 46/58 |
| 2020/0256578 A1 | 8/2020 | Meis et al. |
| 2021/0018247 A1 | 1/2021 | Hanson et al. |
| 2021/0063021 A1 | 3/2021 | Salpietra |
| 2021/0095889 A1 | 4/2021 | Park et al. |
| 2021/0106938 A1 | 4/2021 | Zimmerman, III et al. |
| 2021/0121816 A1 | 4/2021 | Kim et al. |
| 2021/0197112 A1 | 7/2021 | Barry et al. |
| 2021/0236682 A1 | 8/2021 | Willette et al. |
| 2021/0252443 A1 | 8/2021 | Ramphal et al. |
| 2021/0387127 A1 | 12/2021 | Wessels et al. |
| 2022/0065494 A1 | 3/2022 | Schempp |
| 2022/0072464 A1 | 3/2022 | Simpson, Jr. et al. |
| 2022/0082039 A1 | 3/2022 | Ishii et al. |
| 2022/0314152 A1 | 10/2022 | Stender et al. |
| 2022/0323893 A1 | 10/2022 | Nordling |
| 2023/0201751 A1 | 6/2023 | Mok |
| 2023/0271125 A1 | 8/2023 | Choi et al. |
| 2024/0399281 A1 | 12/2024 | Mok |
| 2025/0001344 A1 | 1/2025 | Mok |

* cited by examiner

Example of maximum dimensions and weight for select classes of mail

| Country | Service | Length | Width | Thickness | Weight |
|---|---|---|---|---|---|
| US | USPS First Class Mail | 15 in. | 12 in. | 0.75 in. | 13 oz. |
| US | USPS First Class Package | 22 in. | 18 in. | 15 in. | 15.999 oz. |
| UK | Royal Mail Large Letter | 353 mm | 250 mm | 25 mm | 750 g |
| Canada | Canada Post Oversize Lettermail | 380 mm | 270 mm | 20 mm | 500 g |
| Australia | Australia Post Large Envelope | 360 mm | 260 mm | 20 mm | 500 g |

FIG. 1

COLLAPSIBLE AND FOLDABLE PLEATED DISPOSABLE AIR FILTER

PRIORITY CLAIM

The present disclosure claims priority to and the benefit of U.S. Provisional Application Ser. No. 63/244,052, filed on Sep. 14, 2021. The contents of that application are hereby incorporated by reference in their entirety.

TECHNICAL FIELD

The present disclosure relates generally to furnace air filters of central air systems. Specifically, this disclosure provides for a replacement air filter media that is collapsible and foldable for efficient storage, shipping and safe disposal.

BACKGROUND

Heating, ventilation, and air conditioning (HVAC) are systems that have become a common staple in providing indoor comfort in residential and commercial buildings. The overall goal of an HVAC system is to provide thermal comfort, as well as an acceptable indoor air quality that is suitable to breathe. HVAC systems have become an important part of residential structures including single family homes, apartment buildings, hotels, and senior living facilities, medium to large industrial and office buildings such as those in skyscrapers and hospitals, where safe and healthy building conditions are regulated and ensured with respect to temperature, humidity, and air quality by using an in-flow of fresh air from outdoors.

In order to use the fresh air from the outdoors, proper ventilation for the buildings must be provided. Ventilation is the process of exchanging or replacing air in any space, to provide high indoor air quality. High air quality involves temperature and humidity control, oxygen replenishment, and removal of unwanted odors, smoke, heat, dust, airborne bacteria, and other contaminants and gases from the air. Ventilation also facilitates the removal of unpleasant smells and excessive moisture by introducing fresh outside air to keep interior building air circulating to prevent stagnation of the interior air. Air filters are an essential component of the ventilation system. HVAC systems typically have a cool air system and a warm air system that distributes cooled or heated air through duct work systems as necessary. The air supply intake is filtered through air cleaners and filters, to remove dust, bacteria, and pollen particles. Failure to replace filters in an HVAC system regularly could lead to reduced air exchange and lower heat exchange rate, result in wasted energy, shortened equipment or system life, and higher energy bills. In some instances, unclean or dirty air filters that have been kept in the system beyond their lifespan, can cause system overheating during operation resulting in damage to the system, or a fire.

Changing the air filters that comprise filter media, regularly reduces the strain on the equipment used to filter and circulate the air. The regular changing of the filters also helps prolong the life of the HVAC system and reduces overall energy consumption. In addition to providing adequate air flow to protect the equipment, these air filters purify the air for the occupants within a residential or commercial setting by removing unwanted polluting contaminants. Filters of increasing efficiency, and capable of filtering out smaller size particles and contaminants, have become more popular as consumers have become more aware and interested in indoor air quality (IAQ).

Air filters are often selected from groups consisting of pleated type or a non-pleated type of filter media. Pleated filters with pleated filter media often allow for more air filter surface area, resulting in less pressure drop across the filter and hence less energy use in order to filter the incoming air. Non-pleated air filters with non-pleated air filter media often include a smaller surface area and result in a shorter filter use life and provide results that are less optimum than the pleated air filter. These are mainly used where cost is the main concern. Typically, pleated air filters with pleated air filter media are provided with a rectangular shape that have standardized length, width, and depth. The filter media occupying only a fraction of the total volume of the assembled air filter.

Most of the weight of the assembled air filter is made up of the cardboard structural frame that holds the pleated media of the air filter. The weight is further made up of galvanized steel mesh used over the filter to support the filter pleats of the filter media and adhesive that holds the entire assembled structural frame and the pleated air filter media together. However, these typical air filters are not compressible, crushable, or foldable due to the semi-rigid cardboard frame and steel mesh. In order to ship the assembled air filters to consumers, the assembled filters are stacked and shipped in rigid boxes to protect them from damage while in transport. Hence the transport cost of these filters form a substantial portion of the total cost of each assembled air filter.

Assembled air filters are made in multiple standardized sizes to fit various established HVAC standards. Most of the weight and volume of the air filters result from the cardboard structural frame, the metal sheet mesh support and the adhesive material used to hold the assembly together. Since current air filters are not compressible, crushable, or foldable, they are sent packed in large boxes, which tend to make these air filters very expensive to the consumer.

There is thus a need, to solve the aforementioned problems and issues, for an air filter that is cost effective and efficient, and avoids the need for large boxes thus reducing the high cost of shipping. There is another need for an air filter constructed of modular strips of air filter media that may be joined together to fit different sizes of air filter frames, as replacement of the air filter media within the fixed filter frame, while the air filter media is also enabled to be folded to sizes that can be easily shipped and disposed of.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

One disclosed example is a foldable and disposable air filter having a plurality of filter strips joined to each other having border edges to define opposite widthwise border edges and opposite lengthwise border edges. A folding crease is formed between one of the widthwise or lengthwise opposite border edges of the frame base allowing the filter strips to be folded for shipment and disposal.

A further implementation of the example air filter is an embodiment where each of the plurality of filter strips includes a plurality of pleats. Another implementation is where the plurality of pleats each include two trapezoid shaped sides joined to form a triangular shape. Another implementation is where each of the plurality of pleats is comprised of synthetic air filter media having a top filtration layer and a back supporting layer. Another implementation is where the filtration layer is one of spun fiberglass material, pleated paper, cotton, a synthetic blend, graphite, foam, a flexible metal blend, or cloth. Another implementation is where the border edges formed by the plurality of filter strips are formed via a hot press. Another implementation is where a seam is formed by joining the filter strips via one of gluing, sewing, melting, welding or attached with tape. Another implementation is where the air filter is configured to be folded at least once on the folding crease and the folded air filter is a size that fits in a standard sized shipping envelope. Another implementation is where the air filter includes at least another folding crease on the border edges perpendicular to those with the folding crease.

Another disclosed example is a method of manufacturing a disposable air filter comprising at least two air filter media strips. In the two strip implementation example, one edge of a first filter strip is attached to an edge of a second filter strip to form two parallel widthwise outer edges and two parallel lengthwise outer edges to define the air filter. A folding crease is formed in either the two parallel width outer edges or the two parallel lengthwise outer edges.

Another implementation of the example method includes forming outer edges from the filter strips via a hot press. Another implementation is where the additional material is provided on the outer edges. Another implementation is where the example method further includes attaching edges of a third filter strip between the filter strips. In one embodiment, the plurality of filter strips are joined together using a tape attaching the seams between each outer edge of the plurality of filter strips. Another implementation is where the first and second filter strips are joined via one of gluing, sewing, melting, welding, or by attaching a tape to form a seam between the first and second filter strips. Another implementation is where the filter strips each include a plurality of pleats. Another implementation is where the plurality of pleats each include two trapezoid shaped sides joined to form a triangular shape. Another implementation is where each of the plurality of pleats is comprised of synthetic filter media having a top filtration layer and a back supporting layer. Another implementation is where the filtration layer is one of spun fiberglass material, pleated paper, cotton, a synthetic blend, graphite, foam, a flexible metal blend, or cloth. Another implementation is where the plurality of pleats are formed in a mold. Another implementation is where the example method further includes folding the air filter media for packing in a shipping container. Another implementation is where the shipping container is one of a vapor barrier-bag with air, a standard envelope, a Polybag, a Soft Pack, or a standard shipping box.

Another disclosed example is an air filter and frame assembly having a foldable air filter media. The foldable air filter media includes a plurality of filter strips joined to each other having border edges to define opposite widthwise border edges and opposite lengthwise border edges. The foldable air filter media also has one or more folding creases formed between one of the widthwise or lengthwise opposite border edges of the frame base allowing the air filter media strips to be folded for shipping or disposal. The assembly further includes a frame having a top cover and a frame base holding air filter. The top cover is attached to the frame base and is latchable to enclose the foldable air filter.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below. Any improvements to the disclosed invention, in the areas of implementation and innovation as is understandable to practitioners of the art are also covered by this disclosed application.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 1 is a table of standard postal package sizes that may accommodate an example foldable air filter, in accordance with an example;

DETAILED DESCRIPTION

Figure 2A:
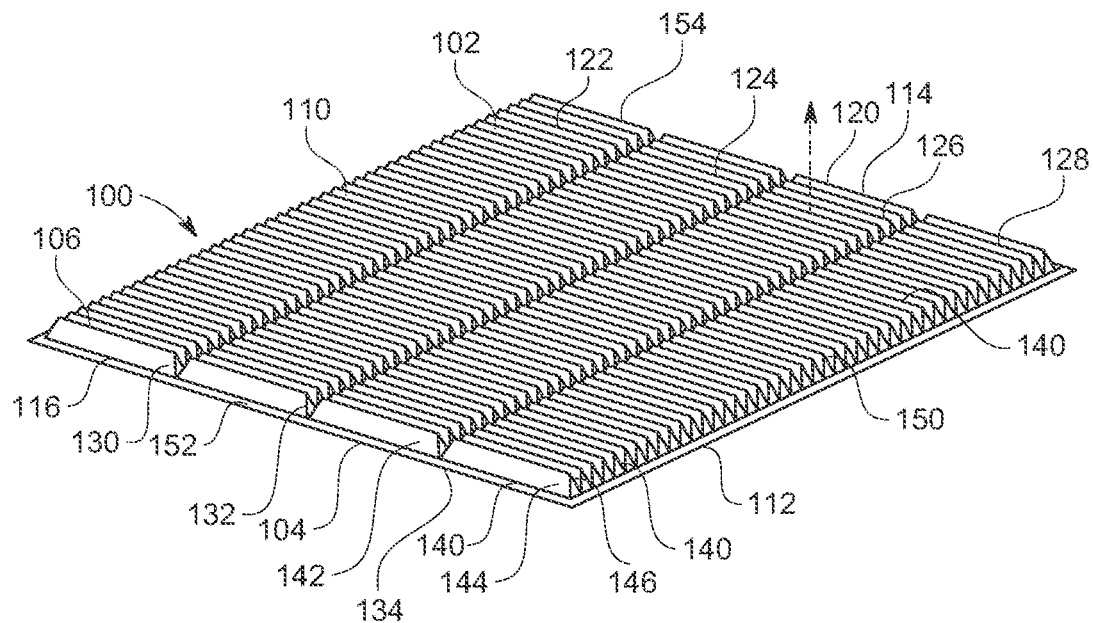
FIG. 2A is a perspective view of an example foldable air filter media, in accordance with an example.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

An example air filter that is collapsible and insertable into a stand-alone frame is disclosed. The design for the example air filter, is one that folds down to a size that fits into a vapor barrier-bag, standard envelope, Polybag, Soft Pack or box for shipping. The details of one such foldable pleated replacement air filter media are provided as a non-limiting example below. The instant disclosure provides for a method for deploying a replacement pleated air filter for use with a corresponding air filter frame. In one preferred example, the replacement pleated air filter media is able to be folded in order to fit into a vapor barrier bag with air to prevent damage to the air filter media to be shipped to the customer.

The need for easy shipping is to ensure that the overall packing stays under the maximum size and weight limits. Though the example above is based on US postal service, it is not meant to be limiting. Other countries and other carriers will have differing standard size packages which are usable for shipping the air filter media. An example of the standard shipping sizes of other countries is shown in the Table in FIG. 1. The design disclosed for the air filter replacement media, is also one that may fold down to a size that fits into a standard envelope, Polybag (USPS plastic mailers), Soft Pack (USPS soft mailing packages) or standard size boxes etc. for shipping. The Table in FIG. 1 is merely a sample of the maximum dimensions and weights allowable for select classes of mail that may be usable for shipping the replacement air filter media.

In order for the example pleated air filter media to fit neatly and securely within a vapor barrier bag with air to be shipped without damage, the pleated air filter media needs to be folded. The folding of the pleated air filter media needs to not only be efficient in size, but also must avoid damaging the air filter accordingly, while also remaining under the weight limits of the packaging. Oftentimes, the example pleated air filter media that is used as a replacement for a consumer, may withstand vacuum packing, though it is not a preferred method, in order to ensure that it meets the proper dimensions and scope of the proposed packaging regulations.

As discussed, the referenced limits in FIG. 1 are merely a sample of the maximum parcel dimensions and weights allowable for select classes of mail in US and other referenced countries. However, these dimensions can be expanded to include requirements for additional countries and the below described embodiments can further be adapted to the shipping requirements of these additional countries.

In order for the example pleated air filter media to fit neatly and securely within package size limits, the example pleated air filter is capable of being folded. The folding of the pleated air filter needs to not only be efficient in size, but avoid damaging the air filter accordingly, while also remaining under the weight limits of the packaging. Oftentimes, the packaging used can be within a vapor barrier bag inflated using air in order to further protect the air filter from crush damage. Multiple air filters can be fit with the same packaging, providing the packaging still fits within size and weight limits for shipping.

The example air filter media can be placed within a filter frame to create a filter assembly in order to maintain the shape and integrity of the air filter itself. The resulting filter assembly can be configured to be positioned within one or more ventilation/air flow systems such as an HVAC, an air purifier, and a furnace. In some instances, a stand-alone air purifier, or a furnace can be implemented in accordance with the air filter media and frame embodiments as described below.

FIG. 2A is a perspective isometric view of an example foldable air filter media 100. The air filter media 100 has a filter media layer 102 that includes bottom side 104 and a top side 106. The filter media 100 includes a lengthwise outer edge 110 and an opposite lengthwise outer edge 112. Two opposite widthwise outer edges 114 and 116 are perpendicular to the outer edges 110 and 112. Thus, the outer edges 110, 112, 114, and 116 define the size and dimensions of the filter media 100.

Based on the position of the air filter media 100 within a ventilation/air flow system, the air flow (represented by an arrow 120 in FIG. 2A) from the air flow system enters from the bottom side 104 of the filter media 100, that is the bottom of the air filter media as assembled in the frame to form an air filter assembly 400 (shown in FIG. 4), and exits from the top side 106 of the filter media 100. The air flow directed through the air filter media 100 is sourced typically from natural outside air and is then forced through the air filter media 100 of the air filter assembly to facilitate the filtering or cleaning of the air before entering the inward dwelling of a residential or commercial structure. Additionally, in some embodiments, the air source can also be recirculated air from within the residential or commercial structure. Accordingly, the filtered air exits through the top side 106 of the air filter media 100.

The filter media layer 102 is formed from a series of pleated filter strips 122, 124, 126, 128 attached together. Thus, the filter strips 122, 124, 126, and 128 define the outer edges 110 and 112 and the outer edges 114 and 116. In this example, a seam 130 is formed between the pleated filter strips 122 and 124. Another seam 132 is formed between the pleated filter strips 124 and 126. Another seam 134 is formed between the pleated filter strips 126 and 128.

As shown, the air filter media 100 includes the opposite lengthwise outer edges 110 and 112. The outer edges 110 and 112 are flat surfaces that surround pleats formed on the filter strips 122 and 128. Each of the outer edges 110 and 112 are configured to maintain a tight seal of the one or more pleats of a pleat strip such as the pleat strips 122 and 128 that form the respective outer edges 110 and 112. In this example, the outer edges 110 and 112 are structured to be a maximum of 1.2 millimeter (mm) thick, in order to create a sealed foundational base for each of the pleats in a pleat strip such as the pleat strips 122 and 128. When the filter media 100 is folded and flattened for shipping, the pleats of each of the pleat strips 122, 124, 126, and 128 are configured to flatten in order to become closely flush with the widthwise outer edges 114 and 116, to provide for more efficient shipping within a standard package. In this example, each of the pleat strips 122, 124, 126, 128 has a thickness of 0.8 mm, a width of 127.22 mm, a length of 600 mm, and a height of 18 mm.

Each of the pleated filter strips such as the pleat filter strip 128 has a series of pleats 140. Each of the pleats 140 have trapezoidal shaped opposite sides 142 and 144 that are joined at a common joint 146. Thus, the side portion of each of the pleats 140, is shaped in a triangular shape with the opposite sides 142 and 144. The tapered sides of the trapezoidal sides 142 and 144 of opposite pleat strips such as the pleats 126 and 128 define the seams such as the seam 134. In this example, the pleats 140 are fabricated of synthetic filter media with a top filtration layer and a back supporting layer.

The tapering of the pleats 140 also works in conjunction with a tapered cross member on a frame that may be inserted in an air flow system in order to effectively guide the filter media 100 into place. Using a tapered cross member for the pleats 140 results in a higher tolerance air flow system design. Matching the tapered sides of the pleats 140 with the tapered cross member makes it easier to position the filter media 100 into position, while also ensuring that the filter media 100 stays into place with gravitational force. Similarly, the sides 142 and 144 of the triangular pleat 140, provides for a planar face of the filter pleat 140. Most of the air flow from an air source forced through the filter media 100 via an associated air flow system will be received and filtered through the planar sides 142 and 144 of the pleat 140. The planar face of the sides 142 and 144 of the filter pleat 140 increases the surface area of the pleat itself 140, and the corresponding filter, in order to minimize the air pressure drop across the entire air filter media 100 of the air filter assembly.

The air filter media 100 also includes a folding crease 150 approximately in the middle of the lengthwise edges 110 and 112. The folding crease 150 allows the replacement air filter media 100 to be folded lengthwise at least once in a first direction or a second direction, in order to facilitate the folding and proper storage within a standard size envelope. The folding feature is essentially accomplished by establishing one or more crease lines that make the replacement air filter media 100 capable of being folded at the crease lines.

In some embodiments, the air filter media 100 can include two or more individual pleated filter strips that are combined together to make a single filter component. Each of the individual pleated filter strips such as the strips 122, 124, 126, and 128 can be attached together and placed on an appropriate frame in order to form the air filter media 100 within the air filter frame to form the air filter assembly. The number of pleat strips determining the size of the filter assembly. Thus, different sized filter assemblies may be constructed by employing different numbers of the pleat strips to generate the air filter media 100.

Figure 2B:
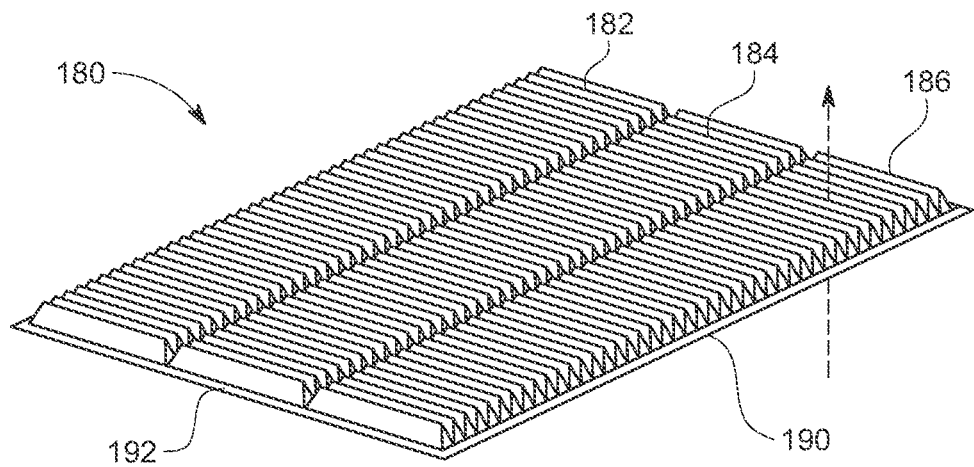
FIG. 2B is a perspective view of a different sized foldable air filter media, in accordance with an example.
Figure 4:
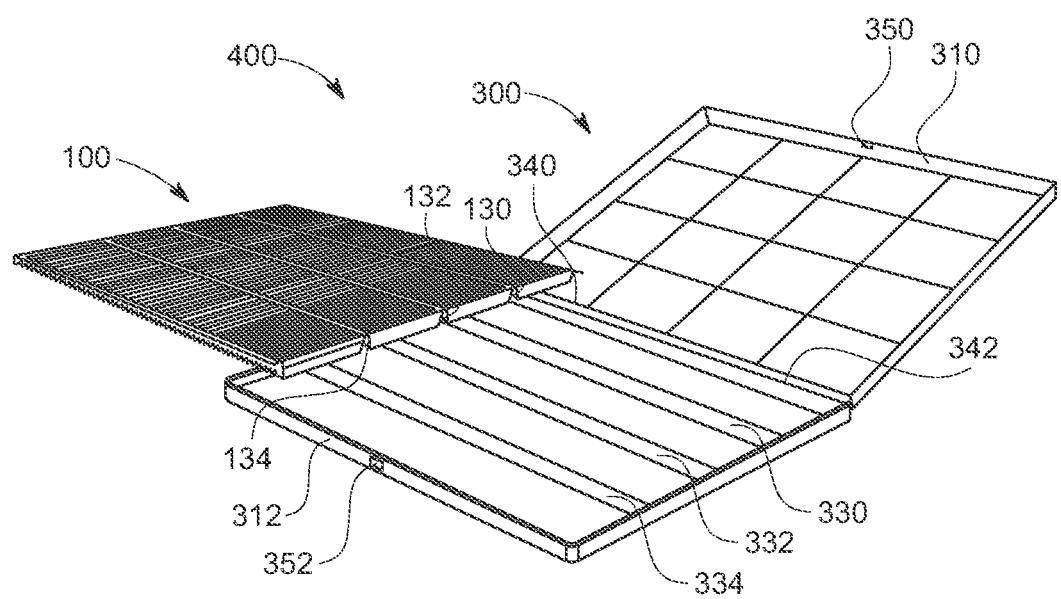
FIG. 4 is an illustration of the air filter media 100 in FIG. 2A in association with a frame, forming an example filter assembly, in accordance with an example.

FIG. 2B is a different sized example air filter media 180 for a filter assembly of similar size to the assembly 400 in FIG. 4 that includes three pleat strips 182, 184, and 186. The air filter media 180 in FIG. 2B may thus be less wide than the air filter media 100 in FIG. 2B but has the same length. Similar to the air filter media 100 in FIG. 2A, the pleat strips 182, 184, and 186 are joined together to form the air filter 180. A crease 190 is formed on the lengthwise edges to allow the air filter media 180 to be folded for shipping. Another crease 192 is formed on the widthwise edges to allow the air filter media 180 to be further folded.

Returning to FIG. 2A, the pleated filter strips 122, 124, 126, and 128 are individually joined to each other using one of the previously discussed methods to form the filter media 100. In order to ensure that the outer edges of each of the pleated filter strips 122, 124, 126 and 128 are securable to a frame, a hot press technique can be used to press the outer edges 110, 112, 114, and 116 defined by the outer edges of the pleated filter strips 122, 124, 126, and 128. This is useful to prevent air leakage around the filter media 100 when in use. The hot press technique is used where the pleats 140 of the filter pleat strips are pleated in a mold. Additional woven or non-woven material can be added along the edges of the pleated filter strips to help facilitate the sealing of the edges by the heat supplied by the hot press.

The thickness of a border defined by the edges 110, 112, 114, and 116, created by the sealing of the hot press, from the pleats 140 of the filter strips 122, 124, 126, and 128, to the outer edges of the length and width of each of the pleat filter strips 122, 124, 126, and 128, can be 6 mm. Additionally, the angle created by the pleats 140 in order to form the planar edge, and triangle trapezoidal shape can be constructed to be at least 18 degrees, effectively creating a tapered edge. Of course, other sizes and dimensions may be used.

The seams 130, 132, and 134 between each of the pleated strips 122, 124, 126 and 128 can be created by the joining of the borders of neighboring pleated strips on each of their associated outer edges. Thus, the seam 130 is created by gluing, sewing, melting, welding, or taping the outer edges of at least two pleated strips such as the pleated strips 122 and 124 together. Similarly, the seam 132 is created by joining the pleated strips 124 and 126 and the seam 134 is created by joining the pleated strips 126 and 18 together.

At least one width-wise folding crease 152 is formed on the front side of the filter media 100. The crease 152 can be one or two creases that are positioned on the bottom side of the widthwise edges 114 and 116. Accordingly, after the filter media 100 is folded lengthwise via the first crease 150, the second crease 152 can subsequently create a fold in order to cause the filter media 100 to be folded a second time width-wise. Another width-wise folding crease 154 can also be employed opposite from the second set of creases 152. That way, when a crease is started on one of the top side edge 116 or the bottom side edge 114, and consistent fold will take place across the entire width of the filter media 100.

When air is forced through the filter media via a ventilation/air filtering system, such as an HVAC, each pleat 140 is capable of receiving the air flow 120 through the bottom side 104 of the filter media 100, and through the top side 106 where the triangular points of the pleats 140 are formed. Each pleat 140 is configured to operate as a pocket for the air to be received within. The pocket is created by the sides 142 and 144. As the air flow through the pockets created by the sides 142 and 144, each pleat 140 retains any debris, dust, or other substances within the pockets, and allows the clean air to flow through. Each of the sides 142 and 144 are configured to be a non-woven synthetic blend of acrylic or polypropylene fibers that are capable of retaining foreign substances in the air flow 120. The sides 142 and 144 can also be made of various blends additional blends selected from one or more of spun fiberglass material, pleated paper, cotton, synthetic blends, graphite, foam, flexible metal blends, cloth, or additional materials that may be suitable for trapping foreign substances.

Each of the pleats 140 are arranged into the associated individual pleated filter strips such as the strips 122, 124, 126, and 128. This arrangement provides the user the benefit of simplified positioning. This is made apparent as the tapered trapezoidal pleats are configured to guide the user along the Y-axis, of the pleats 140, and the strips 122, 124, 126, and 128 make it easier to position the replacement air filter media 100 along the X-axis. As such, the user only needs to slide the air filter media 100 to the left and the right in order to center it as the filter strips 122, 124, 126, and 128 can ride along ribs in a frame that holds the replacement air filter media 100 in the air flow system. Ultimately, the tapered sides of the pleats 140 effectively work as a guide to securely position the air filter media 100 within the frame of the air flow system. Additionally, the filter pleats 140 allow the air filter media 100 to only require the top lip of the air filter media 100 to be sealed against the frame while still capturing the constant flow of air to be filtered from the air input source that is passing through the air filter media 100. This method provides the advantage of avoiding air from the air input source from bypassing the filter media on the sides of the filter.

Figure 2C:
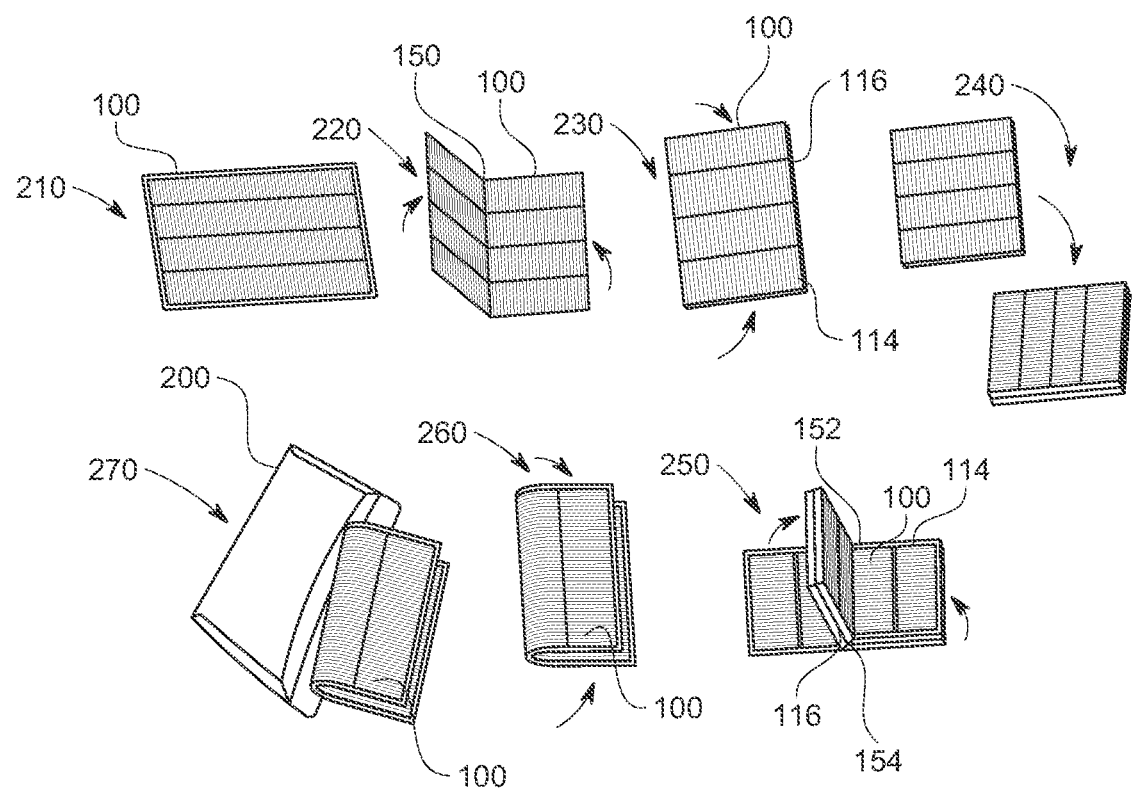
FIG. 2C is an illustration of the air filter media 100 in FIG. 2A when folded to fit in a large envelope, in accordance with an example.

FIG. 2C is an illustration of the process of folding the air filter media 100 in FIG. 1A to fit in a large envelope 200. In this example, the standard large envelope 200 is defined by the U.S. Postal Service as having a maximum length of 22 inches, a maximum width of 18 inches, a maximum thickness of 15 inches. The air filter media 100 may be adapted for shipping in other standard sized envelopes such as those shown in the Table in FIG. 1. In the first step 210, the filter media 100 is positioned flatly, width wise, with the bottom side 106 facing upwards so the open part of the pockets of the pleats 140 face upwards, in preparation for a first fold across the length of the replacement air filter media 100. The filter media 100 itself can be placed on a hard object, or a sturdy structure, in order to ensure that the folds are precise and consistent. In a second step 220, a first fold commences across the length of the filter media 100. The first lengthwise fold is folded across the first set of creases 150. If the replaced/removed filter media 100 had been completely soiled, or full of dust, with the first fold, the contaminants could be retained inside the filter through this fold. With this first fold, a third step 230 shows that the filter media 100 has been folded in half lengthwise, with the outer edges 114 and 116 touching.

In a fourth step 240, the filter media 100 is rotated 90 degrees in preparation for the second fold. In a fifth step 250, the filter media 100 is folded along the creases 152 and 154. In a sixth step 260, the second fold is completed across the width of the filter media 100, in order to create a twice folded, compact configuration. This second fold is completed along the creases 152 and 154 on the edges 114 and 116. The completing of the second fold, causes the filter media 100 to now be half of the width, and half of the length in size. In a seventh step 270, the twice folded filter media 100 is then placed inside of the large standard shipping sized envelope 200 in preparation for shipping. When received, the filter media 100 may be taken out of the envelope 200. The filter media 100 then may simply be unfolded from the compact configuration for use in a corresponding air filter frame.

Figure 3:
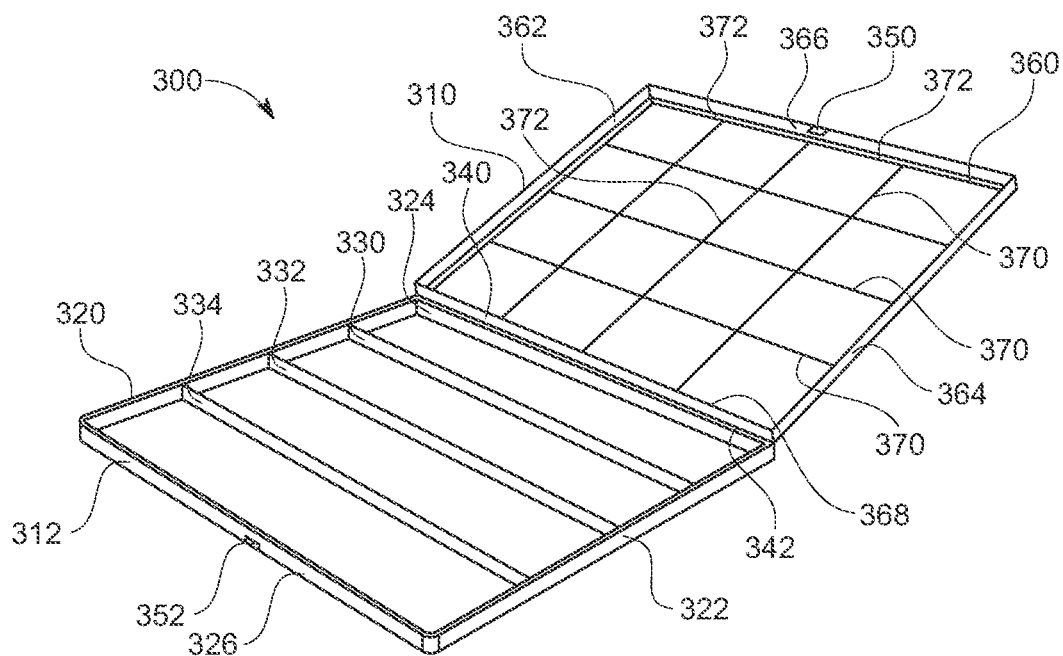
FIG. 3 is an illustration of a frame that accommodates the air filter media 100 in FIG. 2A, to be implemented as an air filter assembly, in accordance with an example.

FIG. 3 is an illustration of a frame 300 for holding an air filter media such as the air filter media 100 in FIG. 2A. When the frame 300 is assembled with the filter media, the combined frame and air filter assembly may be inserted in the ventilation/air flow system such as an HVAC system. The example frame 300 is constructed from two injection molded parts, a frame cover 310, and a frame base 312. The frame base 312 includes a pair of frame supports 320 and 322. Another pair of frame supports 324 and 326 are attached between the ends of the frame supports 320 and 322 to define the frame base 312. The frame supports 320 and 322 is configured to be positioned widthwise of the base 312 of the frame 300. This frame supports 320 and 322 provide an edge with a flat surface that the edges of a filter such as the filter media 100 in FIG. 2A will rest on, in order to create a seal with the frame 300 and one side of the filter. The frame supports 324 and 326 are positioned along the length of the frame base 312 of the frame 300. The frame support 324 is configured to have a triangular or trapezoid shaped cross section in order to help a user, such as a maintenance person replacing the air filter, to install and replace the filter accordingly. The frame supports 324 and 326 also have a flat surface for the filter frame 300 to create a seal against on one of the sides of the filter.

The frame base 312 may also include a set of cross members 330, 332, and 334. Each of the cross members 330, 332, and 334 are attached between the frame supports 320 and 322. Thus, the cross members 330, 332, and 334 are parallel to the frame supports 324 and 326. In this example, the cross members 330, 332, and 334 can be spaced 8 centimeters (cm) to 30 (cm) apart in order to provide adequate support for the filter against the air flow direction. The closeness of the cross members 330, 332, and 334 allows the filter to resist flattening, and deformation caused by the force of the air flow. The cross members 330, 332, and 334 can have either a triangular or trapezoid cross-section in order to help guide a user when replacing a filter media such as the filter media 100 in FIG. 1 into the frame 300, thereby improving the tolerance for user accuracy during replacement. In this example, the seams 130, 132, and 134 in the filter media 100 in FIG. 2A fit in the cross members 330, 332, and 334 when the filter media 100 is inserted in the frame 300. In some embodiments, filter ribs that are formed at the joint between two strips of filter media may engage the cross members 330, 332, and 334. Such ribs can vary in size, and quantity, depending on the size of the filter assembly. For example, a 20 inch by 25 inch by 1 inch filter can have 3 ribs, while a 16 inch, by 25 inch by 1 inch filter may have 2 ribs. The number of cross members depends on the size of the frame and corresponding number of filter strips in the filter media.

The frame cover 310 and the frame base 312 can be ultrasonically welded together. The frame cover 310 may be made from a flexible plastic in order to support two living hinges 340 and 342 connecting the frame cover 310 to the frame base 312. In some embodiments, the flexible plastic of the frame cover 310 can be polypropylene. The frame base 312 can be made of a stiff plastic. In some embodiments, the stiff plastic can be acrylonitrile butadiene styrene (ABS). The frame base 312 is configured to support a filter such as the filter media 100 in FIG. 1A when the filter is placed within the frame 300. The frame cover 310 is lowered over the frame base 312 in order to securely enclose the filter within the frame 300. The filter is then secured within the filter frame 300 along all four sides of the filter. On one side of the frame cover 310, the living hinges 340 and 342 join the top of the frame base 312 with the frame cover 310. The frame cover 310 pinches the edges of the filter media 100 that rest on the borders of the frame supports 330, 332, 334, and 336. Accordingly, the frame cover 310 is configured to rotate and close about the hinges 340 and 342.

In one embodiment, the frame 300 can include a latching mechanism on the frame cover 310 and the frame base 312. The latching mechanism includes a latching device 350 on the cover 310 and a corresponding latching device 352 on the support 326 of the frame base 312. The corresponding latching devices 350 and 352 allow for the cover 310 to be secured to the base 312. In some instances, this can be a key and latch system, or magnetized lock, or another similar latching device.

The frame 300 further includes a top layer 360 that is supported by the borders of the frame cover 310. The top layer 360 includes side edges 362 and 364 and an open lateral edge 366 that holds the latching device 350. The side edges 362 and 364 and the lateral edge 366 overlap the supports 320, 322, and 326 respectively of the frame base 312 to create a seal when the frame cover 310 is lowered over the frame base 312. A closed lateral edge 368 holds the hinges 340 and 342 and is thus rotatably attached to the support 324 of the frame base 312.

In this example, the top layer 360 includes a series of cross latched wires 370 in a grid pattern. The cross latched wires 370 are configured to retain the air filter media 100 and prevent the air filter media 100 from falling out of the frame 300 when the frame 300 is in an upside-down position. This is most common when the filter and frame 300 are being installed within a residential or commercial ceiling.

The frame 300 further includes one or more retaining clips 372 on the lengthwise edges 366 and 368 of the frame cover 310. The retaining clips 372 are thus positioned along the length wise edges of the filter frame 300 when the filter frame cover 310 is closed. The forced air is greatest along the length of the filter assembly. As such, the lengthwise outer edges of the filter media 100 are at risk of deformation, and sinking inward relative to the frame 300. In order to oppose this force, the one or more retaining clips 372, are configured to secure the lengthwise edge of the filter frame on both sides of the filter assembly.

In accordance with the above described embodiments, and elements, FIG. 4 depicts the filter media 100 shown in FIG. 2A, in association with the frame 300 in FIG. 3 in an open position to form a filter assembly 400. As shown in FIG. 4, the filter media 100 is configured to be placed within the frame 300. The frame 300, is shown in an open position, as the frame cover 310 is positioned away from the frame base 312 by the living hinges 340 and 342. The filter media 100 can be placed within the frame base 312. In this example, the seams 130, 132, and 134 may be aligned with the cross members 330, 332, and 334 to allow proper placement of the filter media 100 in the frame base 312.

Figure 5:
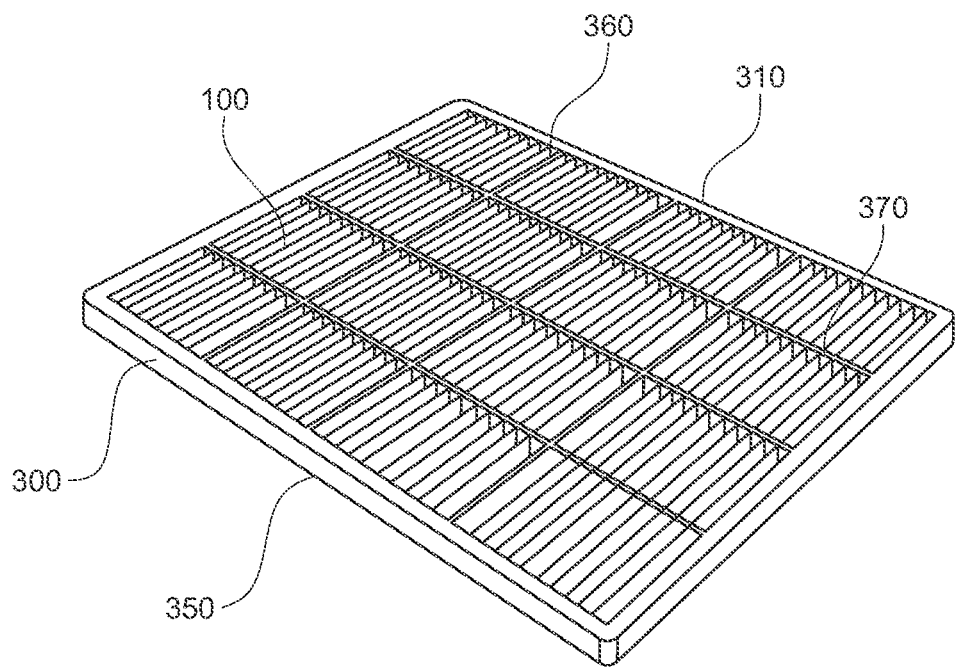
FIG. 5 is an illustration of the filter assembly 400 in FIG. 4 in a closed position, in accordance with an example.

The frame cover 310 can then be rotated towards the frame base 312 in order to facilitate closure of the frame 300. FIG. 5 is a top perspective view of the frame 300 in a closed position. The frame cover 310 is rotated and the latching mechanisms 350 and 352 are joined thereby attaching the frame cover 310 to the frame base 312. The cross hatched wires 370 of the top layer 360 of the cover 310 hold the filter media 100 in place.

Figure 6:
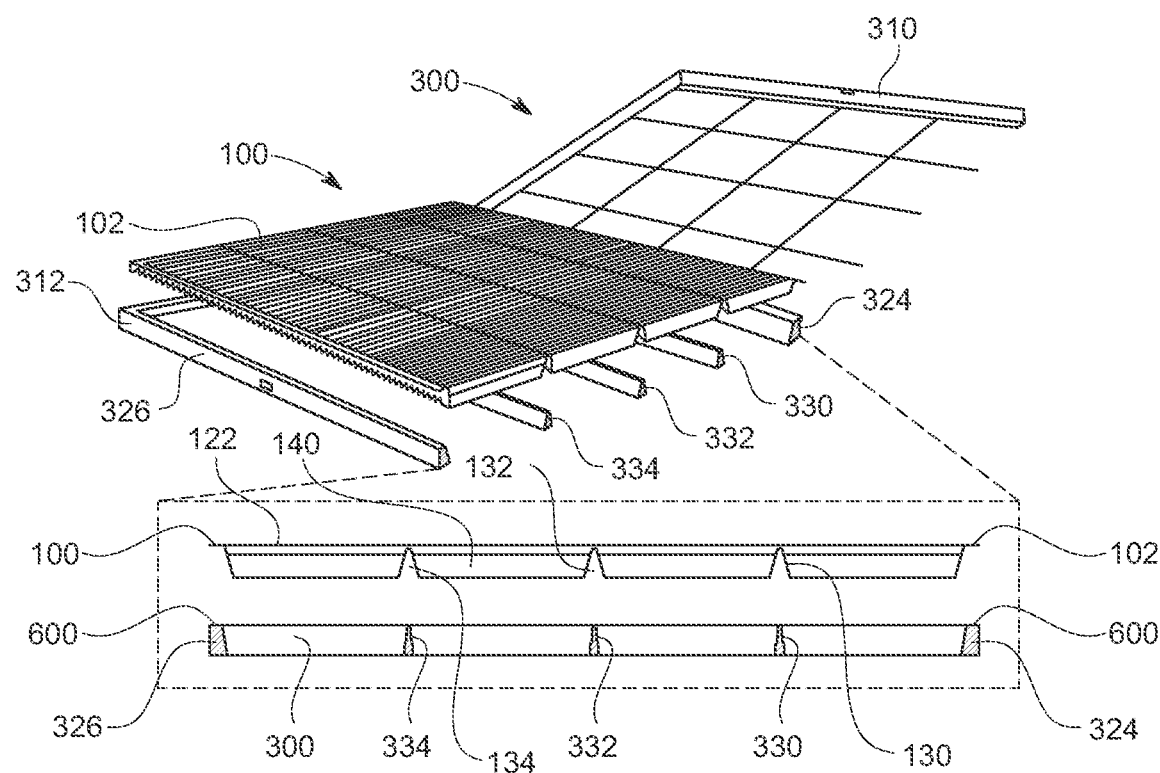
FIG. 6 is a side view of the filter assembly 400 in FIG. 4, in accordance with an example.
Figure 7:
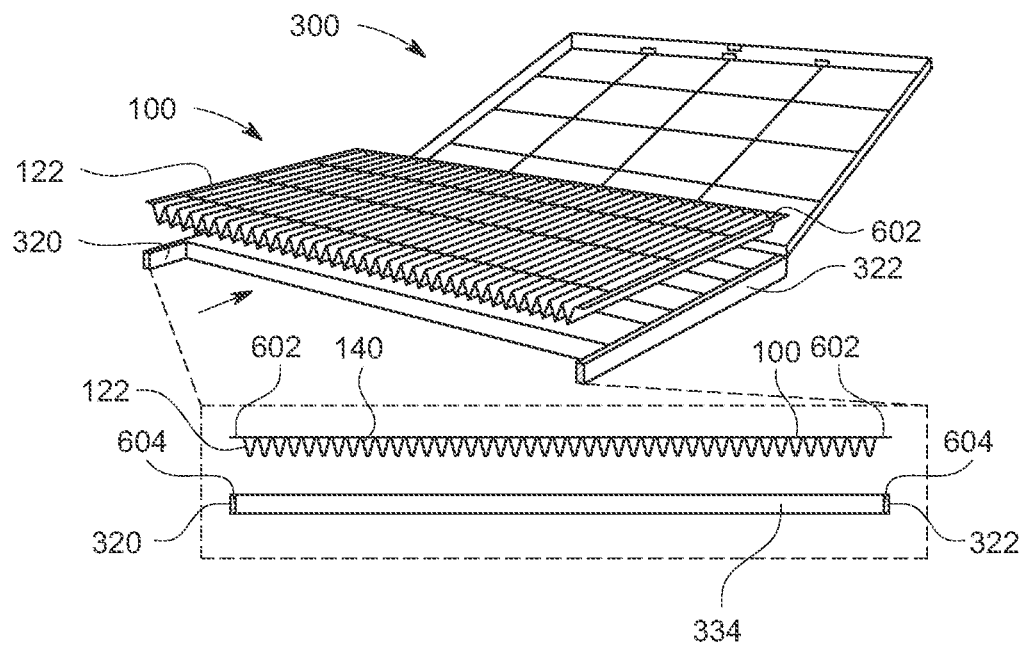
FIG. 7 is a section view of the filter assembly 400 in FIG. 4, in accordance with an example.

FIG. 6 is a side view of the filter assembly of the filter media 100 positioned relative to the frame 300 when the frame cover 310 is in an open position. FIG. 7 is a section view of the filter media 100 positioned relative to the frame 300 when the frame cover 310 is in an open position. Like elements in FIGS. 6-7 are labeled with identical numerals with their counterparts in FIGS. 2A-3. As shown from the side and the section views in FIGS. 6-7, the top surface of the frame supports 324 and 326 form a lip 600 that borders the entire filter media 100. The outer edges of the pleat filter strips 122, 124, 126 and 128 define a corresponding outer lip of the filter media 100 that borders the pleats 140 of the pleat filter strips 122, 124, 126, and 128. The lip 600 of the frame supports 324 and 326 contacts to the outer lip of the filter media 100. As shown in FIG. 6, each of the supports 324 and 326 have an interior side that is tapered. The tapering of the edges of the supports 324 and 326 allows for a tight fit of the sides of the pleats 140 of the filter media 100, while allowing the secure seal between the frame 300 and the edges of the filter media 100. As such, they complement the tapered filter pleats 140. Both sides of the pleats 140 of the filter media 100 are tapered in order to help guide the filter media 100 when mating with the cross members 330, 332, and 334 of the frame 300. Similarly, the tapering on both sides of the longitudinal cross members 330, 332, and 334 are highlighted as well, in order to display the complement to the tapered filter pleats 140 that form the seams 130, 132, and 134. The tapering of each of the frame edges, allows for a close fit with the filter pleats 140 in order to ensure that the filter media 100 itself has a secure fit within the frame 300. The close fit creates a seal to prevent air flow from escaping, and to ensure the maximum amount of forced air is filtered accordingly through the filter media 100.

The filter assembly of the filter media 100 and the frame 300, as similarly described in the above discussion, further establishes the widthwise lip edge 602 that borders the ends of the pleat strips 122, 124, 126, and 128 of the filter media 100. Additionally, a corresponding surface 604 on the supports 320 and 324, further supports the lip edge 602 of the filter media 100. The lip edge 602 of the filter media 100 includes the sides the pleats 140 on the ends of the filter strips 122, 124, 126, and 128. The lip edges 602 ensure that further support is provided to the filter media 100 when secured within the frame 300, in accordance with the above-described embodiments.

The following disclosed examples of an air filter provide advantages that supersede currently available solutions. The example air filter provides for the advantage of lower shipping costs. Currently available solutions are not capable of fitting an air filter within a standard large envelope size, thus incurring additional shipping costs for the consumer. A further advantage of the example air filter is that it is capable of fitting within a standard large shipping envelope, providing the advantage of decreased waste. Additionally, the example air filter is capable of being folded up neatly in order to be disposed of without taking up excessive space. The ability to be folded, further provides the advantage of encapsulating any trapped particulate matter and avoiding crushing the air filter, which typically for rigid cardboard framed filters could release harmful toxins, bacteria, dust, and contaminants into the air and subsequently the breathing canals of a nearby living organism.

Features include the ability of the example filter to be folded to a size to be inserted and shipped in a standard size large postal envelop to reduce cost of shipping. Other features include the capability to replace the example filter within a frame enabled to support and retain the filter during operation; the structural construct of the filter to enable shipment and for disposal; the structural construct of the filter that enable easy insertion and mating with the frame for edge seal; the structural construct of the filter that enable low pressure drop across the filter; the structure of the frame providing capability for support to the replacement filter; and the closure mechanism of the typical frame.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A foldable and disposable air filter media configured to be enclosed in a fixed size frame meeting established HVAC standards, the air filter media comprising:
 a plurality of filter strips joined to each other having border edges to define opposite widthwise border edges and opposite lengthwise border edges, wherein the border edges have hot pressed seals to prevent air leakage around edges of the filter media, wherein each of the plurality of filter strips includes a plurality of pleats each having a triangular shape, wherein the triangular shape is formed by two trapezoid shaped sides, each of the sides having a bottom edge, a parallel top edge, a pair of tapered side edges each joining one end of the bottom edge to one end of the top edge, the tapered side edges being symmetrical and being tapered at an identical angle relative to the bottom edge, the top edges joined together to from an apex of the triangular shape, wherein the top edges are shorter than the bottom edges to define a tapered space between bordering filter strips to accommodate a tapered cross support of the fixed size frame between the bordering filter strips; and
 a first folding crease formed between one of the width wise or lengthwise opposite border edges allowing the filter strips to be folded.

2. The air filter media of claim 1, wherein each of the plurality of pleats is comprised of synthetic filter media having a top filtration layer and a back supporting layer.

3. The air filter media of claim 2, wherein the filtration layer is one of spun fiberglass material, pleated paper, cotton, a synthetic blend, graphite, foam, a flexible metal blend, or cloth.

4. The air filter media of claim 1, wherein a seam is formed by joining the filter strips via one of gluing, sewing, melting, welding or taping.

5. The air filter media of claim 1, wherein, the air filter media is configured to be folded at least once on the first folding crease and the folded air filter media is a size that fits in a standard sized shipping envelope.

6. The air filter media of claim 1, further comprising a second folding crease on the border edges perpendicular to the first folding crease.

7. The air filter media of claim 4, wherein the seam formed by joining the filter strips forms the first folding crease.

8. An air filter assembly comprising:
 a foldable air filter media including:
  a plurality of filter strips joined to each other having border edges to define opposite widthwise border edges and opposite lengthwise border edges, wherein each filter strip comprise a plurality of pleats each including two trapezoid shaped sides joined to form a triangular shape, wherein each of the trapezoid shaped sides have a bottom edge, a parallel top edge, and a pair of tapered side edges each joining one end of the bottom edge to one end of the top edge, the tapered side edges being symmetrical and being tapered at an identical angle relative to the bottom edge, the top edges joined together to from an apex of the triangular shape, and wherein the border edges perpendicular to the pleats are formed via a hot press to prevent air leak; and
  a folding crease formed between one of the opposite widthwise border edges or opposite lengthwise border edges allowing the filter strips to be folded; and
 a fixed size frame meeting established HVAC standards, the fixed size frame having a top cover and a frame base for holding the foldable air filter media, wherein the top cover is attached to the frame base to enclose the foldable air filter media, wherein each of the opposite width wise border edges and the opposite lengthwise border edges rest on corresponding flat borders of the frame base and are pinched by corresponding flat borders of the top cover.

9. The air filter assembly of claim 8, wherein each of the plurality of pleats are formed in a mold.

10. The air filter assembly of claim 8, wherein each of the plurality of pleats of the filter media is comprised of a self-supporting synthetic filter media that comprises one or more of spun fiberglass material, pleated paper, cotton, a synthetic blend, graphite, foam, a flexible metal blend, or cloth.

11. A foldable disposable air filter media for being held by a fixed frame having a size meeting HVAC standards, the air filter media comprising:
 at least two air filter media strips, wherein one edge of a first air filter media strip is attached to an edge of a second air filter media strip to form two parallel widthwise outer edges and two parallel lengthwise outer edges to define the air filter media; and
 a first folding crease formed in either of the two parallel width outer edges or the two parallel lengthwise outer edges of the attached air filter media strips, wherein each filter media strip comprises a plurality of pleats, the plurality of pleats each including two trapezoid shaped sides joined to form a triangular shape; and wherein border edges of the filter strips are joined to each other to define opposite width wise border edges and opposite lengthwise border edges, wherein each of the border edges include hot pressed seals to prevent air leakage, and wherein each of the trapezoidal shaped sides have a parallel bottom edge, a top edge, and a pair of tapered side edges each joining one end of the bottom edge to one end of the top edge, the tapered side edges being symmetrical and being tapered at an identical angle relative to the corresponding bottom edge, the top edges joined together to from an apex of the triangular shape, and wherein the top edges are shorter than the corresponding bottom edges to define a tapered space between the first and second air filter media strips to accommodate a tapered support of the fixed frame between the bordering filter strips.

12. The foldable disposable air filter media of claim 11, wherein each of the plurality of pleats is either comprised of synthetic filter media having a top filtration layer and a back supporting layer or made with a self-supporting filter layer.

13. The foldable disposable air filter media of claim 11, wherein a seam is formed by joining the first and second filter media strips via one of gluing, sewing, melting, welding or taping.

14. The foldable disposable air filter media of claim 12, wherein the self-supporting filter layer is one of spun fiberglass material, pleated paper, cotton, a synthetic blend, graphite, foam, a flexible metal blend, or cloth.

15. The foldable disposable air filter media of claim 11, further comprising a second folding crease formed in either the two parallel width outer edges or the two parallel length wise outer edges of the attached air filter media strips, the second folding crease perpendicular to the first folding crease.

* * * * *